July 19, 1949.  A. CADELLA  2,476,695
FOOD CHOPPER
Filed July 28, 1947  2 Sheets-Sheet 2

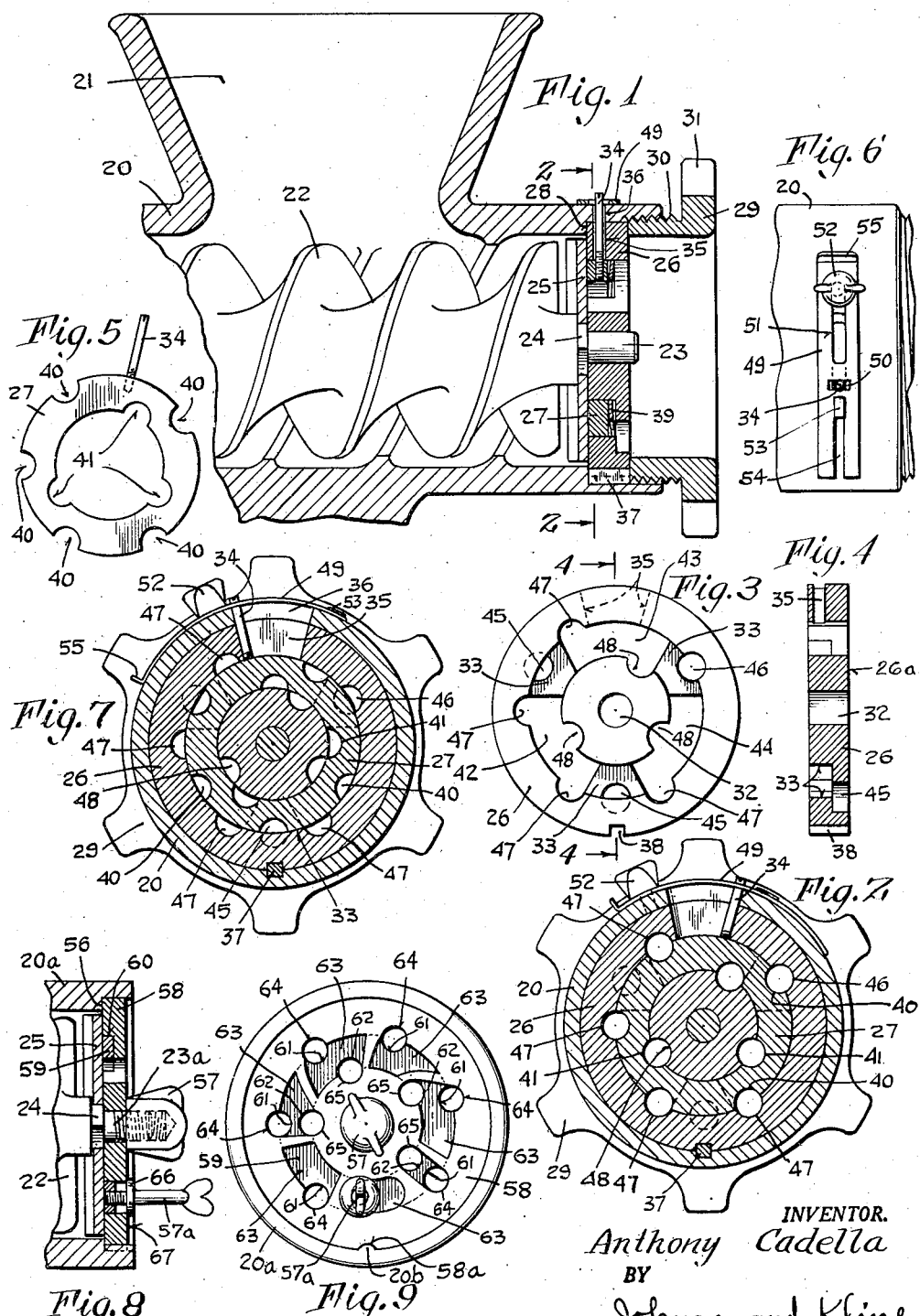

INVENTOR.
Anthony Cadella
BY
Johnson and Kline
ATTORNEYS

Patented July 19, 1949

2,476,695

UNITED STATES PATENT OFFICE 2,476,695

FOOD CHOPPER

Anthony Cadella, Fairfield, Conn.

Application July 28, 1947, Serial No. 764,198

13 Claims. (Cl. 146—189)

This invention relates to meat or food choppers.

An object of the invention is to provide for a food or meat chopper, improved means for controlling the size of the chopped particles whereby different particle sizes may be produced through use of a simple adjustment without requiring dismantling of the parts and without altering the capacity (i. e. the total or combined effective area of the food outlets) and the feeding rate of the chopper. Thus, when the control means is set to produce small food particles it will pass the same quantity of food in a given time as when the means is set to produce large particles, so that the feed screw of the chopper may function properly at all times to receive and press food through the outlets. This uniformity of capacity and feeding is effected by providing for the food outlets being of greater number when they are regulated to be of small size than when they are regulated to be of large size.

The invention is shown as applied to a meat grinder, and in accomplishing the above object there is provided, for cooperation with the cutter of the meat grinder, a novel sizing or controlling means comprising essentially a pair of cooperable relatively movable members having portions some or all of which form meat outlets of different sizes and in different numbers when the portions are in different positions of registration, said portions registering when the members are either of two different relative rotative positions, and the said portions being so located and constituted that the total or combined effective cross-sectional area of the meat outlets provided thereby remains substantially the same regardless of which of said two positions the members are in. That is, the organization is such that the number of meat outlets is greater and the individual effective cross-sectional areas are less when the members are in one position than when the members are in the other position.

In one embodiment of the invention illustrated herein, the members are of circular shape and nest one in the other, the nested member having the form of an annulus, and the nesting member having the form of a disk with an annular groove in one face for receiving the said annulus. The disk has apertures in it, some of which open solely into the groove and others of which pass completely through edge portions of the groove, and the annulus has notches in its inner and outer peripheries which are cooperable with the said apertures to produce the desired result stated above. Adjustment of the members is effected by a screw carried by the annulus and extending radially therefrom, the said screw passing through slots in the disk and in the casing of the meat grinder, and engaging an adjustment plate secured to the outside of the grinder casing. The disk-like member is locked or keyed to the casing so that shifting of the annulus changes the relative position of the members, to change the size and number of meat outlets produced by the cooperable portions thereof.

In another embodiment of the invention illustrated herein, the cooperable members are held in their different relative positions by a screw carried by the annular member and extending substantially parallel to the axis thereof, the said screw passing through an arcuate slot in the disk-like member and having a nut whereby the members may be clamped together to prevent relative turning.

In still another embodiment of the invention wherein the parts are producible from sheet metal stampings, etc. the members comprise flat disks which have apertures so shaped and located that a large number of relatively small meat outlets may be provided or a small number of relatively large meat outlets may be provided, depending upon the relative positions of the disks. Each of the disks has an arm extending from a peripheral portion, one of said arms having a screw passing through a slot in the other arm, whereby the arms may be clamped together to hold the disks in their adjusted positions against relative shifting.

Another object of the invention is to provide in a food or meat grinder an improved adjustable means for controlling the size of the meat particles as characterized above, the said means being so organized that one of the cooperable members thereof may be used alone, that is, separate from the other to produce large chunks of food or meat of much greater size than those which may be produced when the members are in cooperable relationship. In accomplishing this, portions of one of the members, preferably bordered by the apertures thereof, are broken away in such a manner that greatly enlarged apertures are produced which do not interfere however with the cooperation between the members to produce the different sizes of meat outlets while maintaining constant cross-sectional area of the outlets. When the member having the greatly enlarged apertures is used alone in conjunction with the cutter of a meat grinder, the enlarged apertures thereof enable the meat to pass from the cutter in large chunks.

Preferably, the structures of the cooperable members are such that when they are adjusted to produce small particles of meat, the size of the meat outlets will be approximately one-half and the number of outlets will be double that obtained when the members are adjusted to produce large particles of meat.

Also, to provide for economy in manufacture, the cooperable members are so constructed that the meat outlets will be completely circular or half-circular, depending on whether larger or smaller particles are to be produced respectively.

Other features and advantages will hereinafter appear.

In the accompanying drawings—

Figure 1 is a fragmentary axial cross-sectional view of a meat grinder having the improved means for controlling the size of the meat particles, illustrating one embodiment of the invention.

Fig. 2 is a vertical cross-sectional view taken on the line 2—2 of Fig. 1, the cooperable sizing members being arranged in relative positions whereby large particles of meat are produced thereby.

Fig. 3 is a plan view of the disk-like cooperable sizing member of Figs. 1 and 2.

Fig. 4 is a section taken on the line 4—4 of Fig. 3.

Fig. 5 is a plan view of the annular or ring-like cooperable member.

Fig. 6 is a fragmentary plan view of the casing of the meat grinder showing the adjustment means for the cooperable members.

Fig. 7 is a view somewhat like Fig. 2 but showing the cooperable members in a different position whereby small meat particles are produced thereby.

Fig. 8 is a fragmentary axial sectional view of a meat grinder illustrating another embodiment of the invention.

Fig. 9 is a face or discharge-end view of the grinder of Fig. 8, showing the cooperable members adjusted to produce large meat particles.

Figure 11:
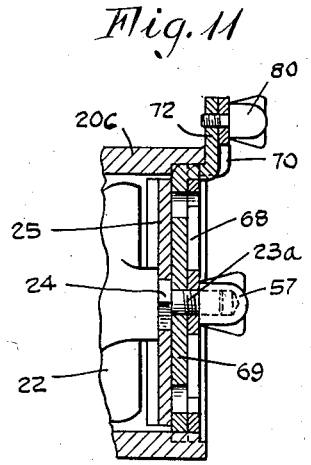
Fig. 11 is a fragmentary axial sectional view of a meat grinder illustrating still another embodiment of the invention, producible from metal stampings.

Referring to Fig. 1, a meat grinder is shown, comprising a casing 20 of the usual tubular form, having a funnel-shaped mouth or feeding opening 21 into which meat is placed, and having a feed screw 22 by which the inserted meat is fed from left to right, to the discharge-end of the casing. At the right-hand end of the screw 22 a stud 23 projects, having a square base portion 24 to which is keyed a cutter 25 for rotation with the screw.

In accordance with the invention, an improved adjustable means is provided adjacent the cutter 25 for controlling the size of the meat particles to be produced by the meat grinder. This means comprises a pair of circular juxtaposed cooperable members 26 and 27 nested with each other and engaging an internal annular shoulder 28 provided in the casing 20.

The members 26 and 27 are maintained in the casing 20 and against the cutter 25 by a clamping ring or annulus 29 having external threads 30 engaging internal threads in the end of the casing 20, the ring having the usual radial projections 31 enabling it to be tightened and loosened by hand.

As shown in Fig. 3, the member 26 is in the form of a disk having a central aperture 32 in which the stud 23 bears, and having an annular groove or recess 33 in its inner face. The member 27, Fig. 5, is in the form of a ring or annulus and is adapted to fit into and occupy the recess 33 of the disk 26.

The members 26 and 27 are relatively adjustable, that is, the member 27 may be adjusted or turned to different positions with respect to the member 26, and for this purpose an adjustment or actuating screw 34 is provided, threaded into the member 27 and extending radially therefrom. The screw 34 passes through a slot 35 in the peripheral portion of the disk 26, and passes through a slot 36 in the casing 20 to project from the upper surface thereof. By shifting the screw 34 in the slots 35 and 36, the member 27 may be turned and may have different rotative positions with respect to the member 26.

Preferably, for the purpose of anchoring the member 26 against turning in the casing 20, the latter is provided with a key 37 and the member 26 with a keyway 38 receiving the key 37.

As shown in Fig. 1, a flat spider spring 39 is interposed between the members 26 and 27 to yieldably hold the latter against the cutter 25.

To provide for meat outlets by which meat particles of different size may be produced by adjustment of the member 27 without changing the capacity of the meat grinder, that is, without changing the effective cross-sectional area of the outlets through which meat is pressed, the inner and outer peripheral portions of the member 27 are provided with pluralities of semi-circular cuts or notches 40 and 41 respectively. For cooperation with the notches 40, the member 26 is provided with a plurality of large apertures 42, 43 and 44 and with a plurality of small apertures 45 and 46. The apertures 42, 43 and 44 are of generally arcuate shape, but have semi-circular notches 47 in their outer walls. The apertures 45 are semi-circular as viewed in Fig. 3, and are formed by drilling the front face of the disk 26 so that the drill partially breaks through and enters the annular recess 33 in the rear face of the disk. The aperture 46 in the disk 26 is preferably circular and is drilled on a center located in the outer wall of the annular recess 33.

Referring to Fig. 2, the apertures 42 and notches 47 thereof and the aperture 46 are so located that the notches may be made to register with the notches 40 in the member 27, and that the aperture 46 may also be made to register with one of the notches 40 of the member 27. Thus, a plurality of perfectly circular openings or meat outlets may be provided through the members 26 and 27 when such registration is effected, the said outlets being five in number, as shown in Fig. 2, and having centers located in the outer periphery of the member 27.

For cooperation with the notches 41 in the inner periphery of the member 27, and to provide additional meat outlets, the apertures 42, 43 and 44 of the member 26 have notches 48 in their inner walls. As shown in Fig. 2, the notches 41 and 48 may be brought in registration with each other respectively when the notches 40 and 47 are in registration, thereby providing a plurality of circular meat outlets having their centers located in the inner periphery of the member 27. In Fig. 2, three such meat outlets are shown, making a total of eight meat outlets of perfectly circular shape. For such relative positioning of the members 26 and 27, as shown in Fig. 2, the adjustment or actuating screw 34 will be located against the right hand end of the notches 35 and 36. If the actuating screw 34 is shifted from right to left as viewed in Fig. 2, so as to rest against the left hand ends of the notches 35 and 36, the meat outlets provided by the members 26 and 27 will be doubled in number, but each outlet will have one-half the effective cross-sectional area and this condition is illustrated in Fig. 7. It will be noted that the circular opening 46 in the member 26 is half closed by the periphery of the member 27. Also, the notches 41 and 48 will be out of registration and therefore each of said notches will become an independent meat outlet, having half the area of the meat outlets of Fig. 2. Likewise, the notches 40 in the outer periphery of the member 27 will be out of registration with the notches 47 in the member 26, and each of these notches will provide an individual meat outlet having half the cross-sectional area of the meat outlets of Fig. 2. The apertures 45 in the member 26 will be in registration with notches 40 in the outer periphery of the member 27, thereby also forming meat outlets as seen in Fig. 7, whereas in Fig. 2 the apertures 45 were blocked off by the member 27.

In Fig. 2 a total of eight completely circular meat outlets are provided, in Fig. 7 a total of 16 meat outlets are provided, each having half the area of the meat outlets of Fig. 2, and therefore the particles of meat produced by the device when adjusted as in Fig. 7 will be approximately half the size of the particles produced by the adjustment of Fig. 2, while at the same time the effective capacity of the meat grinder will remain substantially the same for either adjustment. This latter is due to the fact that the combined cross-sectional area of the meat outlets shown in Fig. 2 is equal to the combined cross-sectional area of the meat outlets shown in Fig. 7, and this fact enables the feed screw 22 to advance the meat at the same rate for either adjustment, resulting in uniformity of feeding and performance of the grinder.

For the purpose of enabling the member 27 to be conveniently adjusted and locked in adjusted position, a thin curved actuator strip 49 is provided, having a slot 50 through which the screw 34 extends and having a second slot 51 accommodating a wing screw 52 threaded into the casing 20. To provide for true movement of the actuator strip 49, a lug 53 is provided on the casing 20 extending through a third slot 54 in the strip, and one end 55 of the strip 49 is turned up to function as a finger piece whereby the strip may be easily grasped and shifted.

Figure 14:
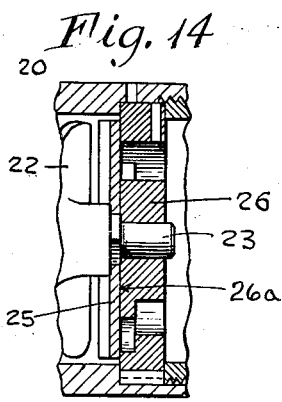
Fig. 14 is a fragmentary sectional view in the same plane as the view of Fig. 1, but showing only the disk-like sizing member being used to produce jumbo-size chunks of food.

In accordance with the invention, the disk-like member 26 may be used alone in the meat grinder, without the member 27, as shown in Fig. 14, in which case its outer face 26a would be placed next to the cutter 25. For such arrangement, the large apertures 42, 43 and 44 in the disk 26 would provide for extremely large chunks of meat being produced from the grinder.

I have thus provided by the present invention an improved easily and quickly adjustable means for controlling the size of meat particles produced by a meat grinder, whereby different-sized particles may be produced without altering the capacity of the grinder, that is, without changing the combined effective cross-sectional area of the meat outlets and without changing the rate of feed of the meat passing through the grinder. Also, the said means is so organized that if desired, a portion of it may be used alone to produce extremely large chunks of meat.

Figure 10:
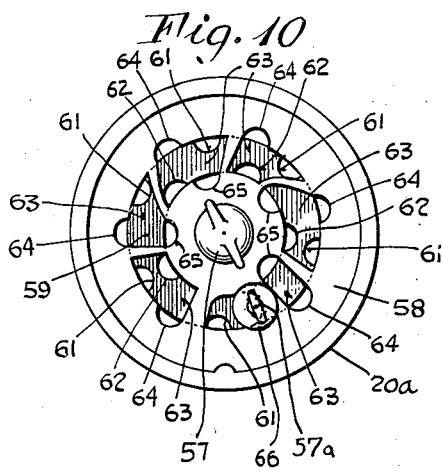
Fig. 10 is a view like Fig. 9 but showing the cooperable members adjusted to produce small meat particles.

Another embodiment of the invention is shown in Figs. 8 to 10. In this embodiment, the adjusting and locking means for the members controlling the size of the meat outlets, extends substantially parallel to the axis of the casing and projects from the discharge end of the meat grinder, and the members are retained in place by a central wing nut of the type usually provided on grinders now in use.

Referring to Fig. 8, the casing 20a of the meat grinder at the discharge end thereof has an internal annular shoulder 56 for positioning the novel gauging or sizing members of the invention, but does not have internal threads as in the grinder of Fig. 1. Instead, the central stud 23a carried by the feeding screw 22 is threaded and mounts a wing nut 57. The stud 23a also has a square base portion 24 to which the cutter 25 is keyed.

In accordance with the invention, novel cooperable members 58 and 59 are provided, Figs. 8 and 9, the member 58 being in the form of a disk, and having a central aperture to accommodate the stud 23a, and the member 59 being in the form of a ring or annulus and nesting in an annular groove or recess 60 in the inner face of the member 58.

Preferably only sufficient clearance is provided between the members 58 and 59 to enable the latter to turn in the member 58, the rear faces of both members being flush with each other and engaging the cutter 25.

Referring to Figs. 9 and 10, the annular member 59 has a plurality of notches 61 in its outer periphery, and also a plurality of notches 62 in its inner periphery. For cooperation with the notches 61 and 62 of the member 59, and to provide meat outlets the member 58 has a plurality of relatively large apertures 63 of different shapes, as shown in Fig. 9, the said apertures having notches 64 in their outer walls, and also having notches 65 in their inner walls.

The member 59 may be shifted with respect to the member 58 and both members may be clamped together in various adjusted positions by a wing screw 57a threaded into the member 59 and extending through one of the apertures 63 of the member 58, the said screw having a flange 66 for engagement with the outer face 67 of the member 58.

Referring to Fig. 9, when the locking screw 65 is located against the left hand end of the aperture 63 through which it passes, the notches 61, 62, 64 and 65 of the members 58 and 59 will will be in registration and will provide completely circular meat outlets, there being ten such outlets shown.

Referring to Fig. 10, when the locking screw 65 is against the right hand end of the aperture 63 through which it extends, the notches 61, 62, 64 and 65 of the members will be out of registration, and each notch will function as a separate and individual meat outlet. The said notches have approximately one-half the area of the completely circular meat outlets shown in Fig. 9, and since there are double the number of notches (and meat outlets) in Fig. 10 than there are in Fig. 9, the combined effective cross-sectional area of all of the meat outlets is the same in both figures. That is, twenty half-circular meat outlets are provided in Fig. 10, whereas ten fully-circular meat outlets are provided in Fig. 9. Therefore, by a simple adjustment effected by shifting the locking screw 65, meat particles of different size may be produced without altering the capacity or output of the meat grinder.

Also, in accordance with the invention, the member 58 may be used alone or separate from the member 59 when it is desired to produce meat particles of enlarged or jumbo size, and for this purpose the member 58 is placed in the meat grinder so that the outer face 67 thereof engages the cutter 25.

The member 58 has a notch 58a in its periphery to accommodate a nib 20b on the casing 20a whereby the member is keyed against turning.

Figure 12:
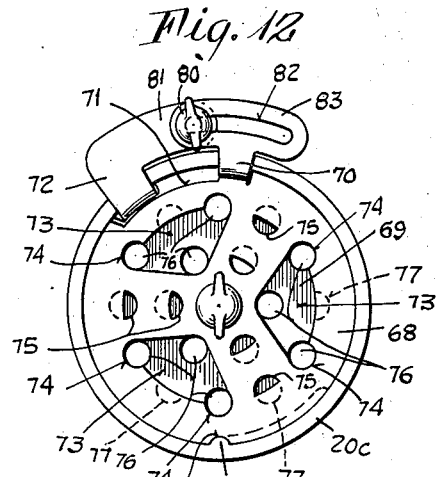
Fig. 12 is a face or discharge-end view of the grinder of Fig. 11, the cooperable members being adjusted for producing large meat particles.
Figure 13:
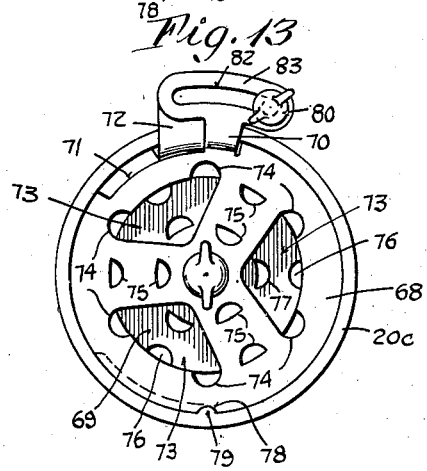
Fig. 13 is a view like Fig. 12, but showing the cooperable members adjusted for producing small meat particles.

Another embodiment of the invention is shown in Figs. 11 through 13 wherein the members which control the size of the meat particles may be economically formed of metal stampings. Parts of the meat grinder shown in Figs. 11 through 13 which are similar to corresponding parts shown in Figs. 8 through 10 have been given like characters.

Referring to Fig. 11, cooperable sheet metal members 68 and 69 are provided, in the form of flat disks, the member 68 having an offset arm 70 extending from its peripheral portion and having an arcuate slot 71 in said peripheral portion adjacent the arm 70, and a member 69 having an offset arm 72 extending from a peripheral portion and passing through the slot 71.

As shown in Figs. 12 and 13, the member 68 has a plurality of relatively large generally triangular apertures 73, the said apertures having notches 74 in their outer edges. Also, between the apertures 73, the member 68 has a plurality of semi-circular apertures 75.

For cooperation with the apertures 73 and 75 and notches 74 of the member 68, the member 69 has a plurality of circular apertures 76, and also a plurality of semi-circular apertures 77.

Both members 68 and 69 are centrally apertured to receive the central stud 23a of the meat grinder, and are held in place by the wing nut 57. Also, the member 68 has a notch 78 in its periphery, accommodating a nib 79 on the meat grinder casing 20c whereby the member is keyed against turning in the casing.

Adjustment of the members with respect to each other and locking of the members in adjusted position is effected by a wing screw 80 threaded into a lateral extension 81 on the arm 72, the said screw extending through an arcuate slot 82 in an enlarged end 83 of the arm 70.

Referring to Fig. 12, when the locking screw 80 is at the left hand end of the slot 82, the apertures and notches of the members 68 and 69 are brought into registration to provide a plurality of completely circular meat outlets, there being nine such outlets shown. When the locking screw 80 is at the right hand end of the slot 82, the apertures and notches of the members 68 and 69 are brought into a different registration whereby a plurality of semi-circular meat outlets are provided, there being double the number of semi-circular outlets provided than completely circular outlets provided by the adjustment of Fig. 12. That is, eighteen semi-circular meat outlets are provided in Fig. 13 and nine fully circular meat outlets are provided in Fig. 12; in either case, however, the combined effective cross-sectional area of the meat outlets remains the same, although the number and size of the outlets may be changed.

According to the invention, the member 68 may be used separate from the member 69, in which case the relatively large aperture 73 of the member 68 will produce meat particles of jumbo size.

In each of the embodiments of the invention the sizing members may have relative settings intermediate the extreme settings shown, to produce food particles of other sizes.

Variations and modifications may be made within the scope of this invention, and portions of the improvements may be used without others.

I claim:

1. Adjustable means for controlling the size of food particles produced by a food chopper, comprising a pair of cooperable relatively movable members each having passages therein to form food outlets, said passages registering with each other when the members are in one of two relative positions and providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the members are in, the number of said outlets being greater when the members are in said other position than when the members are in the said one position.

2. Adjustable means for controlling the size of food particles produced by a food chopper, comprising a pair of cooperable relatively movable members each having pasages therein to form food outlets, said passages registering with each other when the members are in one of two relative positions and providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the members are in, the number of said outlets being greater when the members are in said other position than when the members are in the said one position; and releasable means for locking the members in either of said two positions.

3. Adjustable means for controlling the size of food particles produced by a food chopper, comprising a pair of cooperable relatively movable members each having passages therein to form food outlets, said passages registering with each other when the members are in one of two relative positions and providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the members are in, the number of said outlets being double when the members are in said other position than when the members are in the said one position.

4. Adjustable means for controlling the size of food particles produced by a food chopper, comprising a pair of cooperable relatively movable members each having semi-circular passages therein to form food outlets, said passages registering with each other when the members are in one of two relative positions and providing circular food outlets of maximum size through which food may be pressed, said passages, when the members are in the other position being out of registration and providing semi-circular food outlets of minimum size, the total combined effective cross-sectional area of the food outlets provided remaining substantially the same regardless of which of said two positions the members are in, the number of said outlets being greater when the members are in said other position than when the members are in the said one position.

5. Adjustable means for controlling the size of food particles produced by a food chopper, comprising a pair of cooperable relatively movable members each having passages therein to form food outlets, said passages registering with each other when the members are in one of two relative positions and providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the members are in, the number of said outlets being greater when the members are in said other position than when the members are in the said one position, the passages in one of said members being of greater cross-sectional area than the maximum size of said food outlets whereby the member if used separate from the other member produces food particles of larger size than if the members are used in cooperable relationship.

6. Adjustable means for controlling the size of food particles produced by a food chopper, comprising a pair of circular cooperable relatively movable members nested one in the other, each having passages therein to form food outlets, said passages registering with each other when the members are in one of two relative positions and providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the members are in, the number of said outlets being greater when the members are in said other position than when the members are in the said one position.

7. Adjustable means for controlling the size of food particles produced by a food chopper, comprising a pair of cooperable relatively movable flat plates disposed broadside to each other, each having passages therein to form food outlets, said passages registering with each other when the plates are in one of two relative positions and providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the plates are in, the number of said outlets being greater when the plates are in said other position than when the plates are in the said one position.

8. Adjustable means for controlling the size of food particles produced by a food chopper, comprising a pair of cooperable relatively movable flat plates disposed broadside to each other, each having apertures therein to form food outlets, said apertures registering with each other when the plates are in one of two relative positions and providing outlets of maximum size through which food may be pressed, said apertures when the plates are in the other position being out of registration and providing food outlets of minimum size, the total combined effective cross-sectional area of the food outlets provided remaining substantially the same regardless of which of said two positions the plates are in, the number of said outlets being greater when the plates are in said other position than when the plates are in the said one position, and the apertures of one plate being of greater cross-sectional area than the maximum size of said food outlets whereby the said plate if used separate from the other plate produces food particles of larger size than if the plates are used in cooperable relationship.

9. Adjustable means for controlling the size of food particles produced by a food chopper, comprising a pair of cooperable relatively movable flat plates disposed broadside to each other and each having passages therein to form food outlets said passages registering with each other when the plates are in one of two relative positions providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the plates are in, the number of said outlets being greater when the plates are in said other position than when the plates are in the said one position, one of said plates having apertures, on which the passages thereof border, of greater cross-sectional area than the maximum size of said food outlets whereby the plate if used separate from the other plate produces food particles of larger size than if the plates are used in cooperable relationship.

10. Adjustable means for controlling the size of food particles produced by a food chopper, comprising a pair of cooperable relatively movable flat circular plates disposed broadside to each other and each having passages therein to form food outlets, said passages registering with each other when the plates are in one of two relative positions and providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the plates are in, the number of said outlets being greater when the plates are in said other position than when the plates are in the said one position, one of said plates having three triangular circularly disposed apertures, on which the said passages thereof border, of greater cross-sectional area than the maximum size of said food outlets whereby the plate if used separate from the other plate produces food particles of larger size than if the plates are used in cooperable relationship.

11. Adjustable means for controlling the size of food particles produced by a food chopper, comprising a pair of cooperable relatively movable members each having passages therein to form food outlets, said passages registering with each other when the members are in one of two relative positions and providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the members are in, the number of said outlets being greater when the members are in said other position than when the members are in the said one position; and releasable means including a screw carried by one of the members, for locking the members in either of said two positions, said other member having a slot through which the screw passes.

12. Adjustable means for controlling the size of food particles produced by a food chopper, comprising a pair of circular cooperable relatively movable members nested one in the other and each having passages therein to form food outlets said passages registering with each other when the members are in one of two relative positions and providing food outlets of maximum size through which food may be pressed, said passages when the members are in the other position being out of registration and providing food outlets of minimum size, the total combined effective cross-sectional area of the food outlets provided remaining substantially the same regardless of which of said two positions the members are in, the number of said outlets being greater when the members are in said other position than when the members are in the said one position; and releasable means including a screw carried by one of the members and extending substantially parallel to the axis thereof, for locking the members in either of said two positions, said other member having a slot through which the screw passes, and said screw clamping the members together.

13. Adjustable means cooperable with the cutter of a food chopper for controlling the size of food particles produced by the chopper, said means comprising a pair of circular cooperable relatively movable members nested one in the other and each having passages therein to form food outlets, said passages registering with each other when the members are in one of two relative positions and providing food outlets of maximum size through which food may be pressed, said passages, when the members are in the other position being out of registration and providing food outlets of minimum size, the total combined effective cross-sectional area of the food outlets provided remaining substantially the same regardless of which of said two positions the members are in, the number of said outlets being greater when the members are in said other position than when the members are in the said one position; and a spring located between the members for yieldably urging one member against the cutter of the food chopper.

ANTHONY CADELLA.

REFERENCES CITED

The following references are of record in the file of this patent:

UNITED STATES PATENTS

| Number | Name | Date |
|---|---|---|
| 419,190 | Ellrich | Jan. 14, 1890 |
| 474,595 | Ellrich | May 10, 1892 |
| 1,145,755 | Doty | July 6, 1915 |
| 1,600,123 | Milici | Sept. 14, 1926 |
| 1,628,998 | Rollman | May 17, 1927 |
| 2,247,012 | Burk | June 24, 1941 |
| 2,281,258 | Benton | Apr. 28, 1942 |
| 2,428,869 | Eastman | Oct. 14, 1947 |